No. 656,093. Patented Aug. 14, 1900.
J. I. CARUTHERS.
LAWN SWEEPER.
(Application filed Dec. 28, 1899.)
(No Model.)
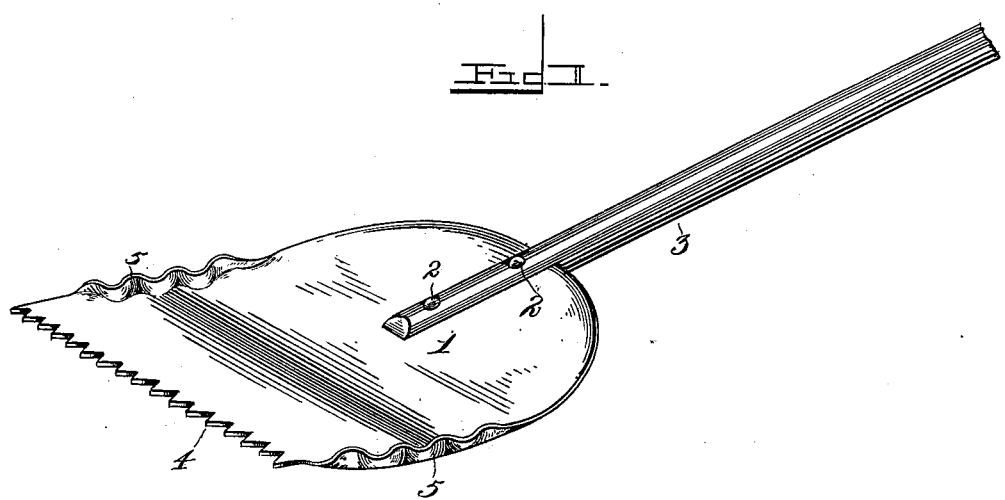
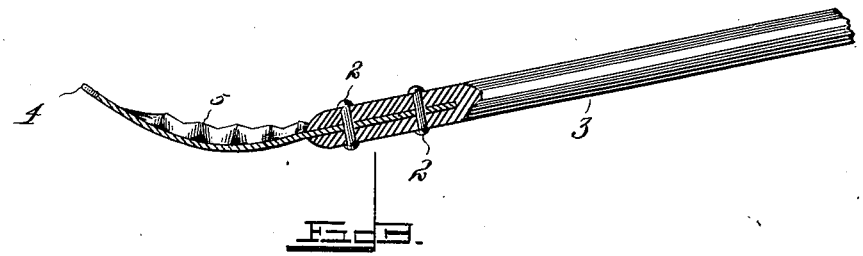
Witnesses
John I. Caruthers Inventor
By his Attorneys,
C. A. Snow & Co.

United States Patent Office.

JOHN IRVING CARUTHERS, OF SAN ANTONIO, TEXAS.

LAWN-SWEEPER.

SPECIFICATION forming part of Letters Patent No. 656,093, dated August 14, 1900.

Application filed December 28, 1899. Serial No. 741,862. (No model.)

*To all whom it may concern:*

Be it known that I, JOHN IRVING CARUTHERS, a citizen of the United States, residing at San Antonio, in the county of Bexar and State of Texas, have invented a new and useful Lawn-Sweeper, of which the following is a specification.

The invention relates to improvements in lawn-sweepers.

One object of the present invention is to improve the construction of lawn-sweepers and to provide a simple, light, and inexpensive device designed for removing leaves, mown grass, and the like from lawns and capable of affording an efficient shovel for depositing such leaves and grass in a receptacle, cart, or the like.

A further object of the invention is to provide a device of this character which will be securely braced, but which will be adapted to yield under the strain to avoid breaking it.

The invention consists in the construction and novel combination and arrangement of parts hereinafter fully described, illustrated in the accompanying drawings, and pointed out in the claims hereto appended.

In the drawings, Figure 1 is a perspective view of a lawn-sweeper constructed in accordance with this invention. Fig. 2 is a longitudinal sectional view of the same. Fig. 3 is a transverse sectional view.

Like numerals of reference designate corresponding parts in all the figures of the drawings.

1 designates a blade or end constructed of thin sheet metal and curved longitudinally to present a concave upper face to form a scoop when it is desired to use the device as a shovel. The rear portion of the blade is secured by suitable fastening devices 2 in a bifurcation of a light handle 3, and the front edge 4 of the blade is provided with a series of approximately-triangular teeth. The device, which is exceedingly light, is designed to be used similarly to a broom for the purpose of sweeping along after the grass has been cut to remove such cut grass, and it is also designed for removing the leaves which litter up a lawn in the fall of the year. When such grass or leaves have been swept into a pile, the latter may be shoveled by the device into a suitable receptacle or into a cart or other vehicle.

In order to strengthen the blade without entirely removing its resiliency, corrugated side flanges 5 are provided. These flanges 5, which are struck up from the metal of the blade at opposite sides thereof, form sides or flanges for the purpose of retaining the material on the blade when the device is used as a shovel, and when the front portion of the blade is subjected to a strain incident to lifting a quantity of leaves or grass the corrugated flanges, which are resilient, are extensible and contractible and are capable of yielding longitudinally under such strain to prevent any liability of the device breaking should the load be too heavy for it. The corrugated side flanges are located at the depression of the blade, as clearly illustrated in Fig. 2 of the accompanying drawings, and they terminate short of the front and back of the blade, as shown in Fig. 1.

It will be seen that the lawn-sweeper is exceedingly light and durable, that it is adapted to be handled similar to an ordinary broom, and that it is capable of performing the functions of a shovel. It will also be apparent that the corrugated flanges, which are located at the side edges of the blade, are resilient and are adapted to contract and expand longitudinally when the front or outer portion of the blade is subjected to a strain from shoveling or otherwise, and that they also serve to retain the material on the blade in shoveling.

What is claimed is—

1. A lawn-sweeper comprising a handle, and a thin blade or head having a concave upper face and provided at opposite sides with corrugated flanges adapted to retain the material on the blade and capable of contracting and expanding longitudinally, substantially as described.

2. A lawn-sweeper comprising a handle, and a sheet-metal blade having teeth at its front or outer edge, said blade being curved longitudinally and provided at opposite sides with resilient corrugated bracing-flanges adapted to expand when the front portion of the blade is subjected to a strain and also serving to retain the material on the blade, substantially as described.

3. A lawn-sweeper comprising a handle, and a thin resilient blade having a concaved upper face and provided at opposite sides with upwardly-extending flanges terminating short of the front and back of the blade, whereby they are adapted to retain material on the blade and support the latter without destroying the resiliency of the same, substantially as described.

In testimony that I claim the foregoing as my own I have hereto affixed my signature in the presence of two witnesses.

JOHN IRVING CARUTHERS.

Witnesses:
THAD. W. SMITH,
JOHN D. SIPPLE.